(12) United States Patent
Greenwood et al.

(10) Patent No.: US 6,379,500 B2
(45) Date of Patent: Apr. 30, 2002

(54) SILICA-BASED SOLS

(75) Inventors: Peter Greenwood, Göteborg; Magnus Olof Linsten; Hans E. Johansson-Vestin, both of Kungälv, all of (SE)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 09/741,300

(22) Filed: Dec. 19, 2000

Related U.S. Application Data

(60) Provisional application No. 60/172,893, filed on Dec. 21, 1999.

(30) Foreign Application Priority Data

Dec. 20, 1999 (EP) .............................................. 99850204
Aug. 24, 2000 (SE) .............................................. 0002986

(51) Int. Cl.$^7$ .......................... D21H 17/68; C01B 33/14
(52) U.S. Cl. ............................... 162/181.6; 162/164.6; 162/183; 423/335; 516/81
(58) Field of Search .................................. 162/128, 158, 162/164.1, 164.4, 164.6, 181.1, 181.2, 181.6, 181.7, 183, 185; 210/660; 423/326, 328.1, 335, 338; 516/77, 79, 80, 81, 87

(56) References Cited

U.S. PATENT DOCUMENTS

| | | | |
|---|---|---|---|
| 2,601,352 A | | 6/1952 | Wolter ......................... 252/313 |
| 3,902,915 A | * | 9/1975 | Crawford et al. ............ 106/485 |
| 3,916,058 A | | 10/1975 | Vossos ......................... 428/241 |
| 3,946,061 A | * | 3/1976 | Buckman et al. ............ 556/410 |
| 4,169,337 A | | 10/1979 | Payne ......................... 51/283 R |
| 4,374,937 A | * | 2/1983 | Nemcek et al. .............. 522/76 |
| 4,388,150 A | | 6/1983 | Sunden et al. .............. 162/175 |
| 4,462,188 A | | 7/1984 | Payne ......................... 51/283 |
| 4,513,158 A | * | 4/1985 | Young et al. ................ 585/527 |
| 4,588,421 A | | 5/1986 | Payne ......................... 51/308 |
| 4,961,825 A | | 10/1990 | Andersson et al. ......... 162/175 |
| 4,980,025 A | | 12/1990 | Andersson et al. ....... 162/168.3 |
| 5,137,639 A | * | 8/1992 | Guzik et al. ................ 210/679 |
| 5,176,891 A | | 1/1993 | Rushmere ................... 423/328.1 |
| 5,368,833 A | | 11/1994 | Johansson et al. .......... 423/338 |
| 5,407,480 A | | 4/1995 | Payton et al. ............... 106/487 |
| 5,603,805 A | * | 2/1997 | Andersson et al. ....... 162/168.3 |
| 5,607,552 A | | 3/1997 | Andersson et al. ....... 162/181.6 |
| 5,846,384 A | | 12/1998 | Schöld et al. ............... 162/175 |
| 5,858,174 A | | 1/1999 | Persson et al. ............ 162/164.1 |
| 6,071,614 A | * | 6/2000 | Farooq ........................ 428/403 |
| 6,083,997 A | * | 7/2000 | Begala et al. ............... 516/79 |
| 6,103,064 A | | 8/2000 | Asplund et al. .......... 162/168.3 |
| 6,203,711 B1 | * | 3/2001 | Moffett ........................ 210/725 |

FOREIGN PATENT DOCUMENTS

| | | | |
|---|---|---|---|
| EP | 0 146 313 | 6/1985 | ......... C01B/33/141 |
| EP | 0 520 109 | 12/1992 | ........... C01B/33/14 |
| EP | 0 952 119 | 10/1999 | ............ C02F/1/52 |
| EP | 1 013 605 | 6/2000 | ........... C01B/33/14 |
| GB | 952352 | 3/1964 | |
| GB | 1 265 550 | 3/1972 | ........... C01B/33/14 |
| GB | 1 366 459 | 9/1974 | ............. C02B/1/20 |
| WO | WO 91/07350 | 5/1991 | ......... C01B/33/146 |
| WO | WO 94/05597 | 3/1994 | ........... C01B/33/26 |
| WO | WO 00/66491 | 11/2000 | ......... C01B/33/143 |
| WO | WO 00/66492 | 11/2000 | ......... C01B/33/143 |

OTHER PUBLICATIONS

R. K. Iler and R. L. Dalton, "Degree of Hydration of Particles of Colloidal Silica In Aqueous Solution," J. Phys. Chem., 60, Jul., 1956, pp. 955–957.

George W. Sears, Jr., "Determination of Specific Surface Area of Colloidal Silica by Titration with Sodium Hydroxide," Analytical Chemistry, vol. 28, No. 12, Dec. 1956, pp. 1981–1983.

Abstract, 83:82229, Ishihara, et al., Stable silica sol composite.

Abstract, 1992–129777, Colloidal silica mfr.—comprises treating alkali silicate soln. by ion–exchange, mixing with mono:ethanolamine to form colloidal silica.

\* cited by examiner

*Primary Examiner*—Peter Chin
*Assistant Examiner*—Eric Hug
(74) *Attorney, Agent, or Firm*—Lainie E. Parker; Ralph J. Mancini

(57) ABSTRACT

An aqueous silica-based sol comprising a nitrogen-containing organic compound and silica-based particles with a specific surface area of at least 300 square meters per gram of silica. The invention further relates to a process for the production of an aqueous silica-based sol comprising a nitrogen-containing organic compound which comprises incorporating a nitrogen-containing organic compound into a silica-based sol containing silica-based particles with a specific surface area of at least 300 square meters per gram of silica. The invention also relates to the use of an aqueous silica-based sol comprising a nitrogen-containing organic compound and silica-based particles with a specific surface area of at least 300 square meters per gram of silica as a flocculating agent in the production of pulp and paper and in water purification. The invention further relates to a process for the production of paper from an aqueous suspension containing cellulosic fibers, and optional fillers, which comprises adding to the suspension (i) an aqueous silica-based sol comprising an organic nitrogen-containing compound and (ii) at least one charged organic polymer, forming and draining the suspension on a wire.

69 Claims, No Drawings

SILICA-BASED SOLS

This application claims priority of European Patent Application No. 99850204.1,filed Dec. 20, 1999, Swedish Patent Application No. 0002986-8, file Aug. 24, 2000, and U.S. Provisional Patent Application No. 60/172,893, filed Dec. 21, 1999.

The present invention generally relates to silica-based sols comprising an organic nitrogen-containing compound which sols are suitable for use as drainage and retention aids in papermaking. More particularly, the invention relates to silica-based sols, a process for the production of silica-based sols, and a process for the production of paper in which silica-based sols are used as additives.

BACKGROUND OF THE INVENTION

In the papermaking art, an aqueous suspension containing cellulosic fibres, and optional fillers and additives, referred to as stock, is fed into a headbox which ejects the stock onto a forming wire. Water is drained from the stock through the forming wire so that a wet web of paper is formed on the wire, and the paper web is further dewatered and dried in the drying section of the paper machine. Drainage and retention aids are conventionally introduced into the stock in order to facilitate drainage and to increase adsorption of fine particles onto the cellulosic fibres so that they are retained with the fibres on the wire.

Silica-based particles are widely used as drainage and retention aids in combination with charged organic polymers like anionic and cationic acrylamide-based polymers and cationic and amphoteric starches. Such additive systems are disclosed in U.S. Pat. Nos. 4,388,150; 4,961,825; 4,980,025; 5,368,833; 5,603,805; 5,607,552; 5,858,174; and 6,103,064; and International Patent Applications WO 00/66491 and WO 00/66492. These systems are among the most efficient drainage and retention aids now in use.

Silica-based particles suitable for use as drainage and retention aids are normally supplied in the form of aqueous colloidal dispersions, so-called sols. Such commercially used silica-based sols usually have a silica content of about 7–15% by weight and contain particles with a specific surface area of at least 300 $m^2/g$. Sols of silica-based particles with higher specific surface areas are usually more dilute to improve storage stability and avoid gel formation.

It would be advantageous to be able to provide silica-based sols with further improved drainage and retention performance and even better stability. It would also be advantageous to be able to provide a process for preparing silica-based sols exhibiting improved drainage, retention and stability properties. It would also be advantageous to be able to provide a papermaking process with improved drainage and retention.

SUMMARY OF THE INVENTION

In accordance with the present invention there is provided amine-modified silica-based sols which are suitable for use as drainage and retention aids in papermaking. The term "drainage and retention aids", as used herein, refers to one or more components (aids, agents or additives) which, when added to a papermaking stock, give better drainage and/or retention than is obtained when not adding the said one or more components. The amine-modified silica-based sols of the invention especially result in improved drainage and/or retention in a paper making process when used in conjunction with charged organic polymers. Hereby the present invention makes it possible to increase the speed of the paper machine and to use a lower dosage of additives to give a corresponding drainage and/or retention effect, thereby leading to an improved papermaking process and economic benefits. The silica-based sols of the invention further exhibit very good stability over extended periods of time, notably very high surface area stability and high stability towards gelation, and hence they can be prepared and shipped at high specific surface areas and high silica concentrations. The sols have improved capability to maintain the high specific surface area on storage at high silica concentrations.

DETAILED DESCRIPTION OF THE INVENTION

The present invention thus relates to silica-based sols comprising an organic nitrogen-containing compound, the preparation of such sols and their use, as further defined in the appended claims. The invention also relates to a process for the production of paper from an aqueous suspension containing cellulosic fibres, and optional fillers, which comprises adding to the suspension a silica-based sol comprising an organic nitrogen-containing compound and at least one charged organic polymer, forming and draining the suspension on a wire, as further defined in the appended claims.

The silica-based sols according to the invention are aqueous sols that contain anionic silica-based particles, i.e. particles based on $SiO_2$ or silicic acid, including colloidal silica, different types of polysilicic acid, polysilicate microgels, colloidal borosilicates, aluminum-modified silica or aluminum silicates, polyaluminosilicate microgels, and mixtures thereof. The particles are preferably colloidal, i.e. in the colloidal range of particle size, and preferably amorphous or essentially amorphous. The silica-based particles suitably have an average particle size below about 50 nm, preferably below about 20 nm and more preferably in the range of from about 1 to about 10 nm. As conventional in silica chemistry, particle size refers to the average size of the primary particles, which may be aggregated or non-aggregated.

The silica-based sols according to the invention contain an organic nitrogen-containing compound, for example an amine which can be selected from primary amines, secondary amines, tertiary amines and quaternary amines, the latter also referred to as quaternary ammonium compounds. The amines can be aromatic, i.e. containing one or more aromatic groups, or aliphatic; the aliphatic amines usually being preferred. The nitrogen-containing compound is preferably water-soluble or water-dispersible. The amine can be uncharged or cationic. Examples of cationic amines include acid addition salts of primary, secondary and tertiary amines and, preferably, quaternary ammonium compounds, as well as their hydroxides. The organic nitrogen-containing compound usually has a molecular weight below 1,000, suitably below 500 and preferably below 300. Preferably, a low molecular weight organic nitrogen-containing compound is used, for example those compounds having up to 25 carbon atoms, suitably up to 20 carbon atoms, preferably from 2 to 12 carbon atoms and most preferably from 2 to 8 carbon atoms. In a preferred embodiment, the organic nitrogen-containing compound has one or more oxygen-containing substituents, for example with oxygen in the form of hydroxyl groups and/or alkyloxy groups. Examples of preferred substituents of this type include hydroxy alkyl groups, e.g. ethanol groups, and methoxy and ethoxy groups. The organic nitrogen-containing compounds may include one or more nitrogen atoms, preferably one or two. Preferred amines include those having a pKa value of at least 6, suitably at least 7 and preferably at least 7.5.

Examples of suitable primary amines, i.e. amines having one organic substituent, include alkylamines, e.g. propylamine, butylamine, cyclohexylamine, alkanolamines, e.g. ethanolamine, and alkoxyalkylamines, e.g. 2-methoxyethylamine. Examples of suitable secondary amines, i.e. amines having two organic substituents, include dialkylamines, e.g. diethylamine, dipropylamine and di-isopropylamine, dialkanolamines, e.g. diethanolamine, and pyrrolidine. Examples of suitable tertiary amines, i.e. amines having three organic substituents, include trialkylamines, e.g. triethylamine, trialkanolamines, e.g. triethanolamine, N,N-dialkylalkanolamines, e.g. N,N-dimethylethanolamine. Examples of suitable quaternary amines, or quaternary ammonium compounds, i.e. amines having four organic substituents, include tetraalkanolamines, e.g. tetraethanol ammonium hydroxide and tetraethanol ammonium chloride, quaternary amines or ammonium compounds with both alkanol and alkyl substituents such as N-alkyltrialkanolamines, e.g. methyltriethanolammonium hydroxide and methyltriethanolammonium chloride, N,N-dialkyldialkanolamines, e.g. dimethyldiethanolammonium hydroxide and dimethyldiethanolammonium chloride, N,N,N-trialkylalkanolamines, e.g. choline hydroxide and choline chloride, N,N,N-trialkylbenzylamines, e.g. dimethylcocobenzylammonium hydroxide and dimethylcocobenzylammonium chloride, tetraalkylammonium salts, e.g. tetramethylammonium hydroxide, tetramethylammonium chloride, tetraethylammonium hydroxide, tetraethylammonium chloride, tetrapropylammonium hydroxide, tetrapropylammonium chloride, diethyldimethylammonium hydroxide, diethyldimethylammonium chloride, triethylmethylammonium hydroxide and triethylmethylammonium chloride. Examples of suitable diamines include aminoalkylalkanolamines, e.g. aminoethylethanolamine, piperazine and nitrogen-substituted piperazines having one or two lower alkyl groups of 1 to 4 carbon atoms. Examples of preferred organic nitrogen-containing compounds include triethanolamine, diethanolamine, dipropylamine, aminoethylethanolamine, 2-methoxyethylamine, N,N-dimethylethanolamine, choline hydroxide, choline chloride, tetramethylammonium hydroxide, tetraethylammonium hydroxide and tetraethanol ammonium hydroxide.

The molar ratio of $SiO_2$ to N of the silica-based sols is usually from 1:1 to 50:1, suitably from 2:1 to 40:1 and preferably from 2.5:1 to 25:1.

The specific surface area of the amine-modified aqueous silica-based sols of the invention is suitably at least 90 $m^2/g$ aqueous sol, i.e. based on the weight of aqueous sol, preferably at least 100 $m^2/g$ aqueous sol, more preferably at least 115 $m^2/g$ aqueous sol and most preferably at least 150 $m^2/g$ aqueous sol. Generally, the specific surface area of the aqueous sol obtained can be up to about 300 $m^2/g$ aqueous sol, suitably up to 250 $m^2/g$ aqueous sol, preferably up to 240 $m^2/g$ aqueous sol.

The specific surface area of the silica-based particles is suitably at least 300 $m^2/g$ $SiO_2$, i.e. based on the weight of $SiO_2$, preferably at least 400 $m^2/g$ $SiO_2$ and most preferably at least 550 $m^2/g$ $SiO_2$, notably at least 700 $m^2/g$ $SiO_2$. Generally, the specific surface area of the particles can be up to about 1700 $m^2/g$ $SiO_2$. In a preferred embodiment of the invention, the specific surface area of the silica-based particles is up to about 1000 $m^2/g$ $SiO_2$, suitably from about 550 to 950 $m^2/g$ $SiO_2$. In another preferred embodiment of the invention, the specific surface area of the silica-based particles is from about 1000 to 1700 $m^2/g$ $SiO_2$, suitably from 1050 to 1500 $m^2/g$ $SiO_2$.

The specific surface area can be measured by means of titration with NaOH in known manner, e.g. as described by Sears in Analytical Chemistry 28(1956):12, 1981–1983 and in U.S. Pat. No. 5,176,891, after appropriate removal of or adjustment for the organic nitrogen-containing compound and any other compounds present in the sample that may disturb the titration like aluminium and boron species. When expressed in square meters per gram of aqueous sol, the specific surface area represents the specific surface area that is available per gram of aqueous silica-based sol. When expressed in square meters per gram of silica, the specific surface area represents the average specific surface area of the silica-based particles present in the sol.

The silica-based sols usually have an S-value within the range of from 10 to 60%, suitably from 15 to 50%, preferably from 15 to 40% and most preferably from 20 to 35%. The S-value can be measured and calculated as described by Iler & Dalton in J. Phys. Chem. 60(1956), 955–957. The S-value, which is affected by silica concentration, density and viscosity of the silica-based sol, can be seen as an indication of the degree of particle aggregation or interparticle attraction and a lower S-value indicates a higher degree aggregation.

The silica-based sols should suitably have a silica content of at least 3% by weight but it is more suitable that the silica content is within the range of from 10 to 60% by weight and preferably from 12 to 40% by weight. In order to reduce storage facilities and to simplify shipping and reduce transportation costs, it is generally preferable to ship high concentration silica-based sols but it is of course possible and usually preferable to dilute the sols to substantially lower silica contents prior to use, for example to silica contents within the range of from 0.05 to 5% by weight, in order to improve mixing with the furnish components.

The viscosity of the silica-based sols can vary depending on, for example, the silica content of the sol, specific surface area of the silica-based particles and the organic nitrogen-containing compound used. Usually, the viscosity is at least 1.5 cP, normally within the range of from 2 to 100 cP, suitably from 2 to 70 cP and preferably from 2.5 to 40 cP. The viscosity, which is suitably measured on sols having a silica content of at least 10% by weight, can be measured by means of known technique, for example using a Brookfield LVDV II+ viscosimeter. The pH of the silica-based sols according to the invention is usually from 7 to 14, suitably from 8 to 13 and preferably from 9 to 12.

The silica-based sols of this invention are preferably stable. The term "stable silica-based sol", as used herein, refers to silica-based sols which when subjected to storage or ageing for one month at 20° C. in dark and non-agitated conditions exhibit an increase in viscosity of less than 100 cP. Suitably the viscosity increase, if any, is less than 50 cP and preferably less than 30 cP when the sols are subjected to the above conditions.

In addition to the nitrogen-containing compound, the silica-based sols according to the invention may also contain other elements, for example aluminum and boron. Such elements may be present as a result of modification using aluminum-containing and boron-containing compounds, respectively. If aluminum is used, the sols can have a molar ratio of $SiO_2$ to $Al_2O_3$ within the range of from 4:1 to 1500:1, suitably from 8:1 to 1000:1 and preferably from 15:1 to 500:1. If boron is used, the sols can have a molar ratio of $SiO_2$ to B within the range of from 4:1 to 1500:1, suitably from 8:1 to 1000:1 and preferably from 15:1 to 500:1.

The aqueous silica-based sols according to the invention can be produced by incorporating a nitrogen-containing compound, for example any of the ones described above and having the above characteristics, into a silica-based sol, optionally followed by concentration of the silica-based sol. The silica-based sol to be used suitably contains anionic silica-based particles. Preferably the particles are colloidal and amorphous or essentially amorphous. The specific surface area of the silica-based particles is suitably at least 300 m$^2$/g SiO$_2$, i.e. based on the weight of SiO$_2$, preferably at least 400 m$^2$/g SiO$_2$ and most preferably at least 550 m$^2$/g SiO$_2$, notably at least 700 m$^2$/g SiO$_2$. Generally, the specific surface area of the particles can be up to about 1700 m$^2$/g SiO$_2$. In a preferred embodiment of the invention, the specific surface area of the silica-based particles is up to about 1000 m$^2$/g SiO$_2$, suitably from about 550 to 950 m$^2$/g SiO$_2$. In another preferred embodiment of the invention, the specific surface area of the silica-based particles is from about 1000 to 1700 m$^2$/g SiO$_2$, suitably from 1050 to 1500 m$^2$/g SiO$_2$. The silica-based sol to be used in the process usually has an S-value within the range of from 10 to 60%, suitably from 15 to 50%, preferably from 15 to 40% and most preferably from 20 to 35%.

The aqueous silica-based sol to be used in the process according to the invention usually has a pH within the range of from 1 to 11. In one preferred aspect of this invention, the pH of the aqueous silica-based sol to be used is within the range of from 1 to 4, usually an acid silica-based sol or polysilicic acid. In another preferred aspect of this invention, the pH of the aqueous silica-based sol to be used is within the range of from 4 to 11, suitably from 7 and most preferably from 8 up to 11.0, preferably up to 10.5.

Acid silica-based sols can be prepared starting from a conventional aqueous silicate solution like alkali water glass, e.g. potassium or sodium water glass, preferably sodium water glass. The molar ratio of SiO$_2$ to M$_2$O, where M is alkali metal, e.g. sodium, potassium, ammonium, or a mixture thereof, in the silicate solution or water glass is suitably within the range of from 1.5:1 to 4.5:1, preferably from 2.5:1 to 3.9:1, and pH is usually around 13 or above 13. Suitably a dilute silicate solution or water glass is used which can have an SiO$_2$ content of from about 3 to about 12% by weight, preferably from about 5 to about 10% by weight. The silicate solution or water glass is normally acidified to a pH of from about 1 to about 4. The acidification can be carried out in known manner by addition of mineral acids, e.g. sulphuric acid, hydrochloric acid and phosphoric acid, or optionally with other chemicals known as suitable for acidification of water glass, e.g. ammonium sulphate and carbon dioxide. However, it is preferred that the acidification is carried out by means of an acid cation exchanger which, among other things, lead to more stable products. The acidification is preferably carried out by means of a strongly acid cation exchange resin, for example of sulfonic acid type. It is preferred that the acidification is carried out to a pH of from about 2 to 4, most preferably from about 2.2 to 3.0. The obtained acid sol, or polysilicic acid, contains particles with a high specific surface area, normally above 1000 m$^2$/g SiO$_2$ and usually around about 1300 to 1500 m$^2$/g SiO$_2$. Acid silica-based sols can also be prepared by acidification of an alkaline silica-based sol, for example by means of acidification as described above.

The organic nitrogen-containing compound is then incorporated into the acid sol, optionally in combination with alkali, e.g. lithium hydroxide, sodium hydroxide, potassium hydroxide and ammonium hydroxide, or an aqueous silicate solution as defined above. The organic nitrogen-containing compound and the alkali can be added simultaneously, either separately or in admixture, or sequentially, e.g. addition of nitrogen-containing compound followed by addition of alkali. The amount of organic nitrogen-containing compound is usually such that the above-mentioned molar ratio of SiO$_2$ to nitrogen (N) is obtained. The pH of the organic nitrogen-containing compound modified silica-based sol is usually from 7 to 13, suitably from 8 to 12.5 and preferably from 9 to 12.

In a preferred embodiment of the invention, the silica-based sol obtained after incorporation of the organic nitrogen-containing compound is further concentrated. Concentration can be carried out in known manner such as, for example, by osmotic methods, evaporation and ultrafiltration. The concentration is suitably carried out to produce silica contents of at least 10% by weight, preferably from 10 to 60% by weight, and more preferably from 12 to 40% by weight. The concentration is further usually carried out so that the silica-based sol obtained in the process has a specific surface area of at least 90 m$^2$/g aqueous sol, i.e., based on the weight of aqueous sol, suitably at least 100 m$^2$/g aqueous sol, preferably at least 115 m$^2$/g aqueous sol and most preferably at least 150 m$^2$/g aqueous sol. Generally, the specific surface area of the aqueous sol obtained can be up to about 300 m$^2$/g aqueous sol, suitably up to 250 m$^2$/g aqueous sol, preferably up to 240 m$^2$/g aqueous sol.

According to the present process, silica-based sols, notably stable silica-based sols, having the above characteristics can be prepared and the produced sols exhibit good storage stability and can be stored for several months without any substantial decrease of the specific surface area and without gelation.

The organic nitrogen-containing compound modified silica-based sols of this invention are suitable for use as drainage and retention aids in papermaking. The silica-based sols can be used in combination with organic polymers which can be selected from anionic, amphoteric, non-ionic and cationic polymers and mixtures thereof, herein also referred to as "main polymer". The use of such polymers as drainage and retention aids is well known in the art. The polymers can be derived from natural or synthetic sources, and they can be linear, branched or cross-linked. Examples of generally suitable main polymers include anionic, amphoteric and cationic starches, anionic, amphoteric and cationic guar gums, and anionic, amphoteric and cationic acrylamide-based polymers, as well as cationic poly (diallyldimethyl ammonium chloride), cationic polyethylene imines, cationic polyamines, polyamidoamines and vinylamide-based polymers, melamine-formaldehyde and urea-formaldehyde resins. Suitably the silica-based sols are used in combination with at least one cationic or amphoteric polymer, preferably cationic polymer. Cationic starch and cationic polyacrylamide are particularly preferred polymers and they can be used singly, together with each other or together with other polymers, e.g. other cationic polymers or anionic polyacrylamide. The molecular weight of the main polymer is suitably above 1,000,000 and preferably above 2,000,000. The upper limit is not critical; it can be about 50,000,000, usually 30,000,000 and suitably about 25,000,000. However, the molecular weight of polymers derived from natural sources may be higher.

When using the silica-based sols in combination with main polymer(s) as mentioned above, it is further preferred to use at least one low molecular weight (hereinafter LMW) cationic organic polymer, commonly referred to and used as anionic trash catchers (ATC). ATCs are known in the art as neutralizing and/or fixing agents for detrimental anionic substances present in the stock and the use thereof in combination with drainage and retention aids often provide further improvements in drainage and/or retention. The LMW cationic organic polymer can be derived from natural or synthetic sources, and preferably it is an LMW synthetic polymer. Suitable organic polymers of this type include LMW highly charged cationic organic polymers such as polyamines, polyamideamines, polyethyleneimines, homo- and copolymers based on diallyldimethyl ammonium chloride, (meth)acrylamides and (meth)acrylates. In relation to the molecular weight of the main polymer, the molecular weight of the LMW cationic organic polymer is preferably lower; it is suitably at least 1,000 and preferably at least 10,000. The upper limit of the molecular weight is usually about 700,000, suitably about 500,000 and usually about 200,000. Preferred combinations of polymers that can be co-used with the silica-based sols of this invention include LMW cationic organic polymer in combination with main polymer(s), such as, for example, cationic starch and/or cationic polyacrylamide, anionic polyacrylamide as well as cationic starch and/or cationic polyacrylamide in combination with anionic polyacrylamide.

The components of the drainage and retention aids according to the invention can be added to the stock in conventional manner and in any order. When using drainage and retention aids comprising a silica-based sol and an organic polymer, e.g. a main polymer, it is preferred to add the polymer to the stock before adding the silica-based sol, even if the opposite order of addition may be used. It is further preferred to add the main polymer before a shear stage, which can be selected from pumping, mixing, cleaning, etc., and to add the silica-based sol after that shear stage. LMW cationic organic polymers, when used, are preferably introduced into the stock prior to introducing the main polymer. Alternatively, the LMW cationic organic polymer and the main polymer can be introduced into stock essentially simultaneously, either separately or in admixture, for example as disclosed in U.S. Pat. No. 5,858,174, which is hereby incorporated herein by reference. The LMW cationic organic polymer and the main polymer are preferably introduced into the stock prior to introducing the silica-based sol.

In a preferred embodiment of this invention, the silica-based sols are used as drainage and retention aids in combination with at least one organic polymer, as described above, and at least one aluminum compound. Aluminum compounds can be used to further improve the drainage and/or retention performance of stock additives comprising silica-based sols. Suitable aluminum salts include alum, aluminates, aluminum chloride, aluminum nitrate and poly-aluminum compounds, such as polyaluminum chlorides, polyaluminum sulphates, polyaluminum compounds containing both chloride and sulphate ions, polyaluminium silicate-sulphates, and mixtures thereof. The polyaluminum compounds may also contain other anions, for example anions from phosphoric acid, organic acids such as citric acid and oxalic acid. Preferred aluminum salts include sodium aluminate, alum and polyaluminum compounds. The aluminum compound can be added before or after the addition of the silica-based sol. Alternatively, or additionally, the aluminum compound can be added simultaneously with the silica-based sol at essentially the same point, either separately or in admixture with it, for example as disclosed by U.S. Pat. No. 5,846,384 which is hereby incorporated herein by reference. In many cases, it is often suitable to add an aluminum compound to the stock early in the process, for example prior to the other additives.

The components of the drainage and retention aids according to the invention are added to the stock to be dewatered in amounts which can vary within wide limits depending on, inter alia, type and number of components, type of furnish, filler content, type of filler, point of addition, etc. Generally the components are added in an amount that give better drainage and/or retention than is obtained when not adding the components. The silica-based sol is usually added in an amount of at least 0.001% by weight, often at least 0.005% by weight, calculated as $SiO_2$ and based on dry stock substance, i.e. cellulosic fibres and optional fillers, and the upper limit is usually 1.0% and suitably 0.5% by weight. The main polymer is usually added in an amount of at least 0.001%, often at least 0.005% by weight, based on dry stock substance, and the upper limit is usually 3% and suitably 1.5% by weight. When using an LMW cationic organic polymer in the process, it can be added in an amount of at least 0.05%, based on dry substance of the stock to be dewatered. Suitably, the amount is in the range of from 0.07 to 0.5%, preferably in the range from 0.1 to 0.35%. When using an aluminum compound in the process, the total amount introduced into the stock to be dewatered depends on the type of aluminum compound used and on other effects desired from it. It is for instance well known in the art to utilise aluminum compounds as precipitants for rosin-based sizing agents. The total amount added is usually at least 0.05%, calculated as $Al_2O_3$ and based on dry stock substance. Suitably the amount is in the range of from 0.1 to 3.0%, preferably in the range from 0.5 to 2.0%.

In a preferred embodiment of the invention, the process is used in the manufacture of paper from a suspension containing cellulosic fibers, and optional fillers, having a high conductivity. Usually, the conductivity of the stock that is dewatered on the wire is at least 0.75 mS/cm, suitably at least 2.0 mS/cm, preferably at least 3.5 mS/cm. Very good drainage and retention results have been observed at conductivity levels of at least 5.0 mS/cm. Conductivity can be measured by standard equipment such as, for example a WTW LF 539 instrument supplied by Christian Berner. The values referred to above are suitably determined by measuring the conductivity of the cellulosic suspension that is fed into or present in the headbox of the paper machine or, alternatively, by measuring the conductivity of white water obtained by dewatering the suspension. High conductivity levels mean high contents of salts (electrolytes) which can be derived from the cellulosic fibres and fillers used to form the stock, in particular in integrated mills where a concentrated aqueous fibre suspension from the pulp mill normally is mixed with water to form a dilute suspension suitable for paper manufacture in the paper mill. The salt may also be derived from various additives introduced into the stock, from the fresh water supplied to the process, or be added deliberately, etc. Further, the content of salts is usually higher in processes where white water is extensively recirculated, which may lead to considerable accumulation of salts in the water circulating in the process.

The present invention further encompasses papermaking processes where white water is extensively recirculated (recycled), i.e. with a high degree of white water closure, for example where from 0 to 30 tons of fresh water are used per ton of dry paper produced, usually less than 20, suitably less than 15, preferably less than 10 and notably less than 5 tons of fresh water per ton of paper. Recirculation of white water obtained in the process suitably comprises mixing the white water with cellulosic fibres and/or optional fillers to form a suspension to be dewatered; preferably it comprises mixing the white water with a suspension containing cellulosic fibres, and optional fillers, before the suspension enters the forming wire for dewatering. The white water can be mixed with the suspension before, between simultaneous with or after introducing the drainage and retention aids. Fresh water can be introduced in the process at any stage; for example, it can be mixed with cellulosic fibres in order to form a suspension, and it can be mixed with a suspension containing cellulosic fibres to dilute it so as to form the suspension to be dewatered, before or after mixing the stock with white water and before, between, simultaneous with or after introducing the components of drainage and retention aids.

Further additives which are conventional in papermaking can of course be used in combination with the additives according to the invention, such as, for example, dry strength agents, wet strength agents, optical brightening agents, dyes, sizing agents like rosin-based sizing agents and cellulose-reactive sizing agents, e.g. alkyl and alkenyl ketene dimers and ketene multimers, alkyl and alkenyl succinic anhydrides, etc. The cellulosic suspension, or stock, can also contain mineral fillers of conventional types such as, for example, kaolin, china clay, titanium dioxide, gypsum, talc and natural and synthetic calcium carbonates such as chalk, ground marble and precipitated calcium carbonate.

The process of this invention is used for the production of paper. The term "paper", as used herein, of course include not only paper and the production thereof, but also other cellulosic fibre-containing sheet or web-like products, such as for example board and paperboard, and the production thereof. The process can be used in the production of paper from different types of suspensions of cellulose-containing fibres and the suspensions should suitably contain at least 25% by weight and preferably at least 50% by weight of such fibres, based on dry substance. The suspension can be based on fibres from chemical pulp such as sulphate, sulphite and organosolv pulps, mechanical pulp such as thermomechanical pulp, chemo-thermomechanical pulp, refiner pulp and groundwood pulp, from both hardwood and softwood, and can also be based on recycled fibres, optionally from de-inked pulps, and mixtures thereof. The pH of the suspension, the stock, can be within the range of from about 3 to about 10. The pH is suitably above 3.5 and preferably within the range of from 4 to 9.

The invention is further illustrated in the following Examples which, however, are not intended to limit the same. Parts and % relate to parts by weight and % by weight, respectively, and all solutions are aqueous, unless otherwise stated.

EXAMPLE 1

A sodium hydroxide stabilized silica sol containing silica particles with a specific surface area of around 800 $m^2$/g $SiO_2$ was deionized with a cationic ion-exchange resin saturated with hydrogen ions. The resulting acid silica sol had a pH of 2.6, $SiO_2$ content of 9.15% by weight and contained silica particles with a specific surface area of 820 $m^2$/g $SiO_2$ and an S-value of about 27%.

To 5000 g of this acid silica sol was added 239 g of a 34% choline hydroxide solution under agitation for about 20 seconds, resulting in an amine stabilized aqueous silica sol with a molar ratio of $SiO_2$ to N of 11:1. In order to reduce the smell from the choline hydroxide, 5.0 g of limonene was added. The final silica-based sol had a pH of 10.8, $SiO_2$ content of 8.73% by weight, S-value of 20% and contained silica particles with a specific surface area of 820 $m^2$/g $SiO_2$.

EXAMPLE 2

Sodium waterglass with a molar ratio of $SiO_2$ to $Na_2O$ of 3.4 was diluted to about 6% by weight $SiO_2$ and treated with a cationic ion-exchange resin saturated with hydrogen ions. The obtained acid silica sol, or polysilicic acid, had a pH of 2.4, $SiO_2$ content of 5.7% by weight and contained silica particles with a specific surface area of 1350 $m^2$/g $SiO_2$ and an S-value of about 32%.

To 2000 g of this polysilicic acid was added 120 g of a 34% choline hydroxide solution under agitation for 2 seconds, resulting in an amine stabilized aqueous silica-based sol which had a pH of 10.4, $SiO_2$ content of 5.4% by weight, molar ratio $SiO_2$ to N of 5.5:1, S-value of 28% and contained silica particles with a specific surface area of 1330 $m^2$/g $SiO_2$.

EXAMPLE 3

A sodium hydroxide stabilized silica sol was deionized in the same manner as in Example 1 resulting in an acid silica sol which had a pH of 2.4, $SiO_2$ content of 9.15% and contained silica particles with a specific surface area of 850 $m^2$/g $SiO_2$.

To 2000 g of this acid silica sol was added 90 g of a 25% solution of tetramethylammonium hydroxide under agitation for 2 seconds. The obtained silica-based sol had a pH of 10.4, $SiO_2$ content of 8.75%, molar ratio of $SiO_2$ to N of 12:1, S-value of 19.5% and contained silica particles with a specific surface area of 850 $m^2$/g $SiO_2$.

EXAMPLE 4

A dilute sodium waterglass solution was ion-exchanged in the same manner as in Example 2. The resulting polysilicic acid had a pH of 2.4, $SiO_2$ content of 5.8% by weight and contained silica particles with a specific surface area of 1365 $m^2$/g $SiO_2$.

To 10000 g of this polysilicic acid was added 552 g of a 25% solution of tetramethylammonium hydroxide under agitation for 20 seconds. The resulting amine stabilized alkaline silica sol, which had an $SiO_2$ content of 5.4% and a molar ratio $SiO_2$ to N of 6.7:1, was concentrated by ultrafiltration to a stable silica-based sol which had a pH of 10.5, $SiO_2$ content of 13.4% by weight, S-value of 27% and contained silica particles with a specific surface area of 1140 $m^2$/g $SiO_2$.

EXAMPLE 5

A sodium hydroxide stabilized silica sol was deionized in the same manner as in Example 1 resulting in an acid silica sol had a pH of 2.5, $SiO_2$ content of 8.7% by weight and contained silica particles with a specific surface area of 860 $m^2$/g $SiO_2$.

To 1750 g of this acid silica sol was added 70 g of a 35% solution of tetraethylammonium hydroxide under agitation for 1 second. The obtained amine stabilized alkaline silica-based sol had a pH of 10.8, $SiO_2$ content of 8.4% by weight, molar ratio $SiO_2$ to N of 15:1, S-value of 21% and contained silica particles with a specific surface area of 930 $m^2$/g $SiO_2$.

EXAMPLE 6

A sodium hydroxide stabilized silica sol was deionized in the same manner as in Example 1 resulting in an acid silica sol with a pH of 2.4, $SiO_2$ content of 8.9% by weight and silica particles with a specific surface area of 820 $m^2$/g $SiO_2$.

To 2000 g of this acid silica sol was added 214 g of a 20% solution of tetrapropylammonium hydroxide under agitation for 15 seconds. The obtained aqueous silica-based sol had a pH of 10.7, $SiO_2$ content of 8.1% by weight, molar ratio SiO$_2$ to N of 14:1, S-value of 24% and contained silica particles with a specific surface area of 820 m$^2$/g SiO$_2$.

EXAMPLE 7

A sodium hydroxide stabilized silica sol containing silica particles with a specific surface area of around 800 m$^2$/g SiO$_2$ was deionized in the same manner as in Example 1 resulting in an acid silica sol with a pH of 2.6, SiO$_2$ content of 9.3% by weight and contained silica particles with a specific surface area of 795 m$^2$/g SiO$_2$.

To 2000 g of this acid silica sol was added 192.4 g of triethanolamine under agitation for 10 seconds. The obtained silica-based sol had a pH of 9.0, SiO$_2$ content of 8.5%, molar ratio SiO$_2$ to N of 2.4:1, S-value of 15% and contained silica particles with a specific surface area of 795 m$^2$/g SiO$_2$.

EXAMPLE 8

To 2000 g of the acid silica sol according to Example 7 was added 30.1 g of triethylamine under agitation for 10 seconds. The obtained silica-based sol had a pH of 10.2, SiO$_2$ content of 9.15%, molar ratio SiO$_2$ to N of 10.4:1, S-value of 25% and contained silica particles with a specific surface area of 800 m$^2$/g SiO$_2$.

EXAMPLE 9

A sodium hydroxide stabilized silica sol was deionized in the same manner as in Example 1 resulting in an acid silica sol with a pH of 2.8, SiO$_2$ content of 9.3% by weight and contained silica particles with a specific surface area of 860 m$^2$/g SiO$_2$.

To 2000 g of this acid silica sol was added 68.1 g of N,N-dimethyletanolamine under agitation for 5 seconds. The obtained silica-based sol had a pH of 10.1, SiO$_2$ content of 9.0%, molar ratio SiO$_2$ to N of 4:1, S-value of 26% and contained silica particles with a specific surface area of 860 m$^2$/g SiO$_2$.

EXAMPLE 10

A sodium hydroxide stabilized silica sol with specific surface area around 800 m$^2$/g was deionized in the same manner as in Example 1 resulting in an acid silica sol which had a pH of 2.6, SiO$_2$ content of 9.1% by weight and contained silica particles with a specific surface area of 880 m$^2$/g SiO$_2$, To 2000 g of this acid silica sol was added 103 g of diethanolamine under agitation for 2 seconds. The obtained amine stabilized alkaline silica sol had pH of 10.1, SiO$_2$ content of 8.65%, molar ratio SiO$_2$ to N of 3:1, S-value of 22% and contained silica particles with a specific surface area of 875 m$^2$/g SiO$_2$.

EXAMPLE 11

To 2000 g of the acid silica sol according to Example 10 was added 40.4 g of diethylamine under agitation for 2 seconds. The obtained silica-based sol had a pH of 11.4, SiO$_2$ content of 8.92%, molar ratio SiO$_2$ to N of 6.5:1, S-value of 22% and contained silica particles with a specific surface area of 880 m$^2$/g SiO$_2$.

EXAMPLE 12

To 2000 g of the acid silica sol according to Example 10 was added 32.4 g of diisopropylamine under agitation for 2 seconds. The obtained silica-based sol had a pH of 11.0, SiO$_2$ content of 8.95%, molar ratio SiO$_2$ to N of 9.5:1, S-value of 25% and contained silica particles with a specific surface area of 885 m$^2$/g SiO$_2$.

EXAMPLE 13

To 2000 g of the acid silica sol according to Example 10 was added 32.5 g of pyrrolidine under agitation for 2 seconds. The obtained silica-based sol had a pH of 11.1, SiO$_2$ content of 8.95%, molar ratio SiO$_2$ to N of 6.6:1, S-value of 25% and contained silica particles with a specific surface area of 880 m$^2$/g SiO$_2$.

EXAMPLE 14

To 2000 g of another deionized silica sol, which had pH of 2.8, SiO$_2$ content of 9.3% and contained silica particles with a specific surface area of 860 m$^2$/g SiO$_2$, was added 35.5 g of dipropylamine under agitation for 2 seconds. The obtained silica-based sol had a pH of 10.6, SiO$_2$ content of 9.10%, molar ratio SiO$_2$ to N of 8.8:1, S-value of 30% and contained silica particles with a specific surface area of 855 m$^2$/g SiO$_2$.

EXAMPLE 15

To 2000 g of acid silica sol according to Example 10 was added 33.7 g of ethanolamine under agitation for 2 seconds. The resulting silica-based sol had a pH of 10.1, SiO$_2$ content of 8.95%, molar ratio SiO$_2$ to N of 5.5:1, S-value of 24% and contained silica particles with a specific surface area of 870 m$^2$/g SiO$_2$.

EXAMPLE 16

To 2000 g of the acid silica sol according to Example 10 was added 30 g of cyclohexylamine under agitation for 2 seconds. The resulting silica-based sol had pH of 10.4, SiO$_2$ content of 9.0%, molar ratio SiO$_2$ to N of 10:1, S-value of 24% and contained silica particles with a specific surface area of 880 m$^2$/g SiO$_2$.

EXAMPLE 17

To 2000 g of another deionized silica sol, which had pH of 2.8, SiO$_2$ content of 9.3% and contained silica particles with a specific surface area of 860 m$^2$/g SiO$_2$, was added 59.1 g of 2-methoxyethylamine under agitation for 2 seconds. The obtained silica-based sol had a pH of 10.2, SiO$_2$ content of 9.0%, molar ratio SiO$_2$ to N of 3.9:1, S-value of 28% and contained silica particles with a specific surface area of 850 m$^2$/g SiO$_2$.

EXAMPLE 18

To 1500 g of deionized silica sol, which had pH of 2.8, SiO$_2$ content of 9.3% and contained silica particles with a specific surface area of 860 m$^2$/g SiO$_2$, was added 66.1 g of aminoethylethanolamine under agitation for 5 seconds. The obtained silica-based sol had a pH of 10.5, SiO$_2$ content of 9.0%, molar ratio SiO$_2$ to amine of 3.6:1, S-value of 26% and contained silica particles with a specific surface area of 875 m2/g SiO$_2$.

EXAMPLE 19

In the following tests, drainage and retention performance of silica-based sols according to Examples 1 to 18 were tested. Drainage performance was evaluated by means of a Dynamic Drainage Analyser (DDA), available from Akribi, Sweden, which measures the time for draining a set volume of stock through a wire when removing a plug and applying a vacuum to that side of the wire opposite to the side on which the stock is present. Retention performance was evaluated by means of a nephelometer by measuring the turbidity of the filtrate, the white water, obtained by draining the stock.

The stock used was based on a standard fine paper furnish consisting of 60% bleached birch sulfate and 40% bleached pine sulfate. 30% calcium carbonate was added to the stock as filler and 0.3 g/l of $Na_2SO_4.10\ H_2O$ was added to increase conductivity. Stock pH was 8.4, conductivity 0.46 mS/cm and consistency 0.29%. In the tests, the silica-based sols were tested in conjunction with a cationic polymer being a cationic starch having a degree of substitution of about 0.042. The starch was added in an amount of 12 kg/tonne, calculated as dry starch on dry stock system, and the silica based sols were added in amounts of 0.25, 0.5 and 1.0 kg/tonne calculated as dry silica on dry stock system.

The silica-based sols according to the invention were tested against two silica-based sols, Ref. 1 and Ref. 2, used for comparative purposes. Ref. 1 is a silica-based of the type disclosed in U.S. Pat. No. 5,368,833 which had an S-value of about 25%, $SiO_2$ content of 8%, specific surface area of 72 $m^2/g$ aqueous sol and contained silica particles with a specific surface area of about 900 $m^2/g$ $SiO_2$ which were surface-modified with aluminium to a degree of 5%. Ref. 2 is a silica sol with an S-value of 36%, $SiO_2$ content of 10.0%, molar ratio $SiO_2$ to $Na_2O$ of 10:1, specific surface area of 88 $m^2/g$ aqueous sol and containing silica particles with a specific surface area of 880 $m^2/g$ $SiO_2$.

The stock was stirred in a baffled jar at a speed of 1500 rpm throughout the test and chemical additions to the stock were conducted as follows:

i) adding cationic polymer followed by stirring for 30 seconds, ii) adding silica-based particles followed by stirring for 15 seconds, iii) draining the stock while automatically recording the drainage time.

Table I shows the results obtained when using varying dosages (kg/tonne, calculated as $SiO_2$ and based on dry stock system) of silica-based sol. Without addition of chemicals, the stock showed a drainage time of 20 seconds and a turbidity of 490 NTU. With addition of cationic starch only, 12 kg/tonne, calculated as dry starch on dry stock system, the stock showed a drainage time of 15 seconds and a turbidity of 70 NTU.

TABLE I

| | Drainage time (sec)/Turbidity (NTU) at $SiO_2$ dosage of | | |
|---|---|---|---|
| Silica-based sol | 0.25 kg/t | 0.5 kg/t | 1.0 kg/t |
| Ref. 1 | 12.20/43 | 10.40/40 | 8.76/37 |
| Ref. 2 | 11.60/45 | 9.83/44 | 8.28/37 |
| Example 1 | 9.11/38 | 7.19/30 | 5.74/28 |
| Example 2 | 8.65/38 | 6.79/35 | 5.76/— |
| Example 3 | 9.34/40 | 7.30/34 | 6.30/28 |
| Example 4 | 8.82/39 | 6.97/36 | 5.86/31 |
| Example 5 | —/— | 7.74/37 | —/— |
| Example 6 | —/— | 8.98/38 | —/— |
| Example 7 | 10.3/42 | 8.77/37 | 6.66/33 |
| Example 8 | 10.3/42 | 8.31/36 | 7.02/33 |
| Example 9 | 9.90/— | 8.80/— | 7.90/— |
| Example 10 | 10.00/— | 8.21/— | 7.07/— |
| Example 11 | 10.00/— | 8.04/— | 7.28/— |
| Example 12 | 9.87/— | 7.97/— | 6.85/— |

TABLE I-continued

| | Drainage time (sec)/Turbidity (NTU) at $SiO_2$ dosage of | | |
|---|---|---|---|
| Silica-based sol | 0.25 kg/t | 0.5 kg/t | 1.0 kg/t |
| Example 13 | 9.60/— | 7.85/— | 6.30/— |
| Example 14 | 10.70/— | 8.80/— | 7.80/— |
| Example 15 | 10.70/— | 8.80/— | 7.51/— |
| Example 16 | 10.30/— | 8.13/— | 6.75/— |
| Example 17 | 10.50/— | 8.80/— | 7.70/— |
| Example 18 | 10.60/— | 9.20/— | 8.20/— |

EXAMPLE 20

In the following tests, drainage and retention performance of the silica-based sol according to Example 3 was further evaluated. The procedure according to Example 19 was followed except that a different stock and different cationic polymers were used.

The furnish was based on 70% cellulosic fibres and 30% clay filler. The fibres consisted of about 70% bleached thermomechanical pulp, 10% stoneground pulp, 10% bleached birch sulphate and 10% bleached pine sulphate pulp. The pulp and filler was dispersed in water to a consistency of 1.5 g/l. In the water was included 25 g/l of bleach water from a bleaching plant containing dissolved organic disturbing substances and calcium chloride ($CaCl_2.10\ H_2O$) in an amount to give a conductivity of 5 mS/cm.

The silica-based sols were used in combination with a highly cationic low molecular weight polyamine, which was added in an amount of 0.5 kg/tonne, calculated dry polymer on dry stock system, and a cationic polyacrylamide, which was added in an amount of 1.0 kg/tonne, calculated dry polymer on dry stock system. The polyamine was added to the stock system followed by stirring for 15 seconds and then the cationic polyacrylamide and silica-based sol were added according to the procedure of Example 19. The silica based sols were added in amounts of 0.25, 0.5 and 1.0 kg/tonne calculated as dry silica on dry stock system.

Table II shows the results obtained when using varying dosages (kg/tonne, calculated as $SiO_2$ and based on dry stock system) of silica-based sol. Without addition of chemicals, the stock showed a drainage time of 22 seconds and a turbidity of 100 NTU. With addition of solely 1 kg/tonne cationic polyacrylamide, calculated as dry polymer on dry stock system, the stock showed a drainage time of 16 seconds and a turbidity of 55 NTU. With addition of 0.5 kg/tonne cationic polyamine and 1 kg/tonne cationic polyacrylamide, calculated as dry polymers on dry stock system, the stock showed a drainage time of 11 seconds and a turbidity of 50 NTU.

TABLE II

| | Drainage time (sec)/Turbidity (NTU) at $SiO_2$ dosage of | | |
|---|---|---|---|
| Silica-based sol | 0.25 kg/t | 0.5 kg/t | 1.0 kg/t |
| Ref. 1 | 12.20/48 | 11.00/47 | 9.90/45 |
| Ref. 2 | 12.30/47 | 10.70/43 | 9.18/41 |
| Example 3 | 10.10/40 | 8.08/39 | 6.27/40 |

EXAMPLE 21

Sodium waterglass with a ratio $SiO_2$ to $Na_2O$ of 3.4:1 was diluted to around 6% $SiO_2$ and treated with a cationic ion-exchange resin saturated with hydrogen ions. The obtained polysilicic acid had a pH of 2.5, $SiO_2$ content of 5.6%, and contained silica particles with a specific surface area of 1300 $m^2/g$ $SiO_2$.

To 5000 g of this polysilicic acid was added 353.5 g of a 34% choline hydroxide solution under agitation for 5 seconds, resulting in an amine stabilized alkaline silica-based sol with a pH of 10.8, $SiO_2$ content of 5.26% and molar ratio $SiO_2$ to N of 4.6. This sol was concentrated by vacuum-evaporation to a stable silica-based sol which had an $SiO_2$ content of 13.9% by weight, S-value about 30% and a specific surface area of 169 $m^2/g$ aqueous sol (measured after 40 days) and contained silica particles with a specific surface area of 1215 $m^2/g$ $SiO_2$ (measured after 40 days). The viscosity was essentially constant during these 40 days; initially 11.8 cP and 11.0 cP after 40 days.

EXAMPLE 22

To 5000 g of the polysilicic acid according to Example 21 was added 347.2 g of a 35% tetraethylammonium hydroxide solution under agitation for 5 seconds. The resulting amine stabilized alkaline silica sol had a pH of 10.8, $SiO_2$ content of 5.26% and molar ratio $SiO_2$ to N of 5.7:1. This sol was concentrated by vacuum-evaporation to a stable silica-based sol which had an $SiO_2$ content of 20.0%, viscosity of 9.9 cP and specific surface area of 250 $m^2/g$ aqueous sol, and contained silica-based particles with a specific surface area of 1250 $m^2/g$ $SiO_2$. After storage for 40 days, the sol showed a viscosity of 8.2 cP, S-value of 43% and specific surface areas of 239 $m^2/g$ aqueous sol and 1195 $m^2/g$ $SiO_2$.

EXAMPLE 23

To 5000 g polysilicic acid having a $SiO_2$ content of 5.1% prepared in a manner similar to Example 21 was added 114 g of dipropylamine under agitation for 5 seconds. The obtained amine stabilized alkaline silica-based sol had pH of 10.8, $SiO_2$ content of 5.0% and molar ratio $SiO_2$ to N of 3.8:1. This sol was concentrated by ultrafiltration to a stable silica-based sol which had an $SiO_2$ content of 14.8%, specific surface area of 196 $m^2/g$ aqueous sol and contained silica particles with a specific surface area of 1320 $m^2/g$ $SiO_2$.

EXAMPLE 24

To 5000 g polysilicic acid having a $SiO_2$ content of 5.5% prepared in a manner similar to Example 21 was added 229.8 g aminoethylethanolamine under agitation for 5 seconds, resulting in an amine stabilized alkaline silica sol with a pH of 10.3, $SiO_2$ content of 5.2% and molar ratio $SiO_2$ to N of 2:1. This sol was concentrated by vacuum-evaporation to a stable silica-based sol with an $SiO_2$ content of 13.6% and specific surface areas of 170 $m^2/g$ aqueous sol and 1255 $m^2/g$ $SiO_2$.

EXAMPLE 25

A sodium hydroxide stabilized silica sol having a $SiO_2$ content of 15% by weight, S-value of about 50% and containing silica particles with a specific surface area of 500 $m^2/g$ $SiO_2$ was deionized in the same manner as in example 1 resulting in an acid silica sol exhibiting a pH of 2.9, $SiO_2$ content of 14.8% by weight and specific surface area of 490 $m^2/g$ $SiO_2$.

To 4000 g of this acid sol was added 414.5 g of a 35% solution of tetraethylammonium hydroxide under agitation for 5 seconds, resulting in an amine stabilized alkaline silica-based sol with a pH of 12.1, $SiO_2$ content of 13.4% and molar ratio $SiO_2$ to N of 10:1. This sol was concentrated by vacuum-evaporation to a stable silica-based sol exhibiting a $SiO_2$ content of 40%, specific surface areas of 224 $m^2/g$ aqueous sol and 560 $m^2/g$ $SiO_2$.

EXAMPLE 26

The drainage (dewatering) and retention performance of the silica-based sols according to Examples 21–24 was investigated in a manner similar Example 19. The results are set forth in Table III.

TABLE III

| Silica-based sol | Drainage time (sec)/Turbidity (NTU) at $SiO_2$ dosage of | | |
|---|---|---|---|
| | 0.25 kg/t | 0.5 kg/t | 1.0 kg/t |
| Ref. 1 | 12.1/49 | 10.2/43 | 9.1/43 |
| Ref. 2 | 11.8/50 | 10.2/50 | 9.0/42 |
| Example 21 | 9.3/36 | 7.4/34 | 6.9/34 |
| Example 22 | 10.3/45 | 9.3/42 | 8.8/41 |
| Example 23 | 10.8/44 | 8.8/42 | 8.1/37 |
| Example 24 | 10.0/44 | 8.7/40 | 7.9/38 |

EXAMPLE 27

To 1024 g of polysilicic acid having a pH of 2.7 and $SiO_2$ content of 5.84% by weight, prepared in a manner similar to Example 21, was added 37.1 g of a 75% by weight solution of choline chloride under agitation resulting in a molar ratio of $SiO_2$ to N of 5.0. To this mixture was added 99.6 g of 3M NaOH under agitation. The obtained silica-based sol had a pH of 11.0, $SiO_2$ content of 5.1% by weight, and contained silica particles with a specific surface area of 1010 $m^2/g$ $SiO_2$.

EXAMPLE 28

To 1068 g of polysilicic acid according to Example 27 was added a mixture of 39 g of a 75% solution of choline chloride and 99.6 g of 3M NaOH under agitation. The obtained silica-based sol had a pH of 11.0, molar ratio $SiO_2$ to N of 5.0, $SiO_2$ content of 5.2% by weight and contained silica-based particles with a specific surface area of 1175 $m^2/g$ $SiO_2$.

EXAMPLE 29

To 50 g of polysilicic acid according to Example 27 was added 0.9 g of a 75% solution of choline chloride under agitation resulting in a molar ratio $SiO_2$ to N of 10.0. The obtained mixture was added to 9.5 g of 3M NaOH under agitation. The obtained silica-based sol had a pH of 10.0.

EXAMPLE 30

50 g of polysilicic acid according to Example 27 was added to a mixture of 0.9 g of a 75% by weight solution of choline chloride and 9.5 g of 3M NaOH under agitation. The obtained silica-based sol had a pH of 10.1, molar ratio $SiO_2$ to N of 10.0 and $SiO_2$ content of 4.8% by weight.

EXAMPLE 31

To 50 g polysilicic acid according to Example 27 was added 0.9 g of a 75% by weight solution of choline chloride under agitation resulting in a molar ratio $SiO_2$ to N of 10.0. To this mixture was added 20.0 g of a water glass solution containing 9.2% by weight $SiO_2$ under agitation resulting in a silica-based sol with a pH of 10.1 and $SiO_2$ content of 6.6% by weight.

EXAMPLE 32

The drainage (dewatering) and retention performance of the silica-based sols according to Examples 27–31 was investigated in a manner similar Example 19 except that calcium chloride was added to the stock to increase the conductivity to 2.0 mS/cm and that the cationic starch was added in an amount of 10 kg/tonne, calculated as dry starch on dry stock system. The results are set forth in Table IV.

TABLE IV

|  | Drainage time (sec)/Turbidity (NTU) at $SiO_2$ dosage of | |
|---|---|---|
| Silica-based sol | 0.5 kg/t | 1.0 kg/t |
| Ref. 1 | 25.5/120 | 21.4/104 |
| Example 27 | 23.4/116 | 16.1/83 |
| Example 28 | 23.1/115 | 14.5/91 |
| Example 29 | 22.3/102 | 16.2/85 |
| Example 30 | 20.9/98 | 14.4/78 |
| Example 31 | 23.0/110 | 17.3/87 |

EXAMPLE 33

An alkali stabilized silica sol was treated with a strong cation exchange resin in acid form and after the treatment the silica sol had a pH of 2.6, $SiO_2$ content of 16.2% by weight and specific surface area of 500 m$^2$/g. To 2530 g of this silica sol was added 294 g of tetraethanol ammonium hydroxide under rapid agitation for about 5 seconds resulting in an amine stabilized silica-based sol with a pH of 11.1, $SiO_2$ content of 14.5% by weight and molar ratio $SiO_2$ to N of 4.9:1. The viscosity was 4.6 cP and specific surface area 500 m$^2$/g. The obtained product was used for drainage performance testing.

It was possible to concentrate this product by evaporation of water to a $SiO_2$ content of 38.8% by weight. The concentrated product had essentially the same specific surface area and could be stored for 6 weeks without gelling. The concentrated product could easily be diluted and showed the same good performance in drainage as the non-concentrated product.

EXAMPLE 34

In the following tests, drainage performance of the non-concentrated silica-based sol according to Example 33 was tested in the same manner as in Example 19. The stock was the same as in Example 19, but calcium chloride was added in an amount to increase the conductivity to 2.0 mS/cm. Stock pH was 8.4 and consistency 0.3% by weight. Cationic starch dosage was 12 kg/t, calculated as dry starch on dry stock. The silica-based sol according to Example 33 was tested against Ref. 3, which is a silica sol with an S-value of about 50, $SiO_2$ content of 15.0% by weight, specific surface area of 75 m$^2$/g aqueous sol and containing silica particles with a specific surface area of about 500 m$^2$/g of $SiO_2$. The results are set forth in Table V.

TABLE V

|  | Drainage time (sec)/Turbidity (NTU) at $SiO_2$ dosage of | | |
|---|---|---|---|
| Silica-based sol | 0.25 kg/t | 0.5 kg/t | 1.0 kg/t |
| Ref. 3 | 28.0 | 23.9 | 17.8 |
| Example 33 | 26.2 | 22.6 | 17.4 |

EXAMPLE 35

To 3000 g of a polysilicic acid having a pH of 2.6, $SiO_2$ content of 5.7% by weight and specific surface area of 1270 m$^2$/g was added 200 g of tetraethanol ammonium hydroxide under rapid agitation for about 5 seconds resulting in an amine stabilized silica-based sol with a pH of 9.9, $SiO_2$ content of 5.4% by weight and molar ratio $SiO_2$ to N of 3:1. The viscosity was 3.2 cP and specific surface area 1160 m$^2$/g. The obtained product was used for drainage performance testing.

It was possible to concentrate this product by evaporation of water to a $SiO_2$ content of 14.5% by weight. The concentrated product was storage stable for more than 2 months and showed the same good drainage performance as the non-concentrated product.

EXAMPLE 36

In the following tests, drainage performance of the non-concentrated silica-based sol according to Example 35 was tested in the same manner as in Example 19. The stock was the same as in Example 19, but calcium chloride was added in an amount to increase the conductivity to 2.0 mS/cm. Stock pH was 8.4 and consistency 0.3% by weight. Cationic starch dosage was 12 kg/t, calculated as dry starch on dry stock. The silica-based sol according to Example 35 was tested against Ref. 2. The results are set forth in Table VI.

TABLE VI

|  | Drainage time (sec)/Turbidity (NTU) at $SiO_2$ dosage of | | |
|---|---|---|---|
| Silica-based sol | 0.25 kg/t | 0.5 kg/t | 1.0 kg/t |
| Ref. 2 | 25.4 | 21.0 | 14.9 |
| Example 35 | 22.7 | 17.4 | 13.8 |

What is claimed is:

1. Aqueous silica-based sol comprising a nitrogen-containing organic compound having up to 25 carbon atoms and silica-based particles with a specific surface area of at least 300 square meters per gram of silica and having an S-value within the range of from 10 to 60%.

2. The aqueous silica-based sol of claim 1, wherein it contains silica-based particles with a specific surface area of from 550 to 1700 square meters per gram of silica.

3. The aqueous silica-based sol of claim 1, wherein the nitrogen-containing organic compound has a molecular weight below 300.

4. The aqueous silica-based sol of claim 1, wherein the S-value is within the range of from 15 to 40%.

5. The aqueous silica-based sol of claim 1, wherein it has a specific surface area in the range of from 150 to 250 square meters per gram of aqueous sol.

6. The aqueous silica-based sol of claim 1, wherein it has a silica content in the range of from 10 to 60% by weight.

7. The aqueous silica-based sol of claim 1, wherein it has a pH of from 8 to 13.

8. The aqueous silica-based sol of claim 1, wherein the nitrogen-containing organic compound is an amine containing from 2 to 12 carbon atoms.

9. The aqueous silica-based sol of claim 1, wherein the nitrogen-containing organic compound is a quaternary amine.

10. The aqueous silica-based sol of claim 1, wherein the nitrogen-containing organic compound is selected from the group consisting of propylamine, butylamine, cyclohexylamine, ethanolamine, 2-methoxyethylamine, diethylamine, dipropylamine, diisopropylamine, diethanolamine, pyrrolidine, triethylamine, triethanolamine, N,N-dimethylethanolamine, tetraethanol ammonium hydroxide, tetraethanol ammonium chloride, methyltriethanolammonium hydroxide, methyltriethanolammonium chloride, dimethyldiethanolammonium hydroxide, dimethyldiethanolammonium chloride, choline hydroxide, choline chloride, dimethylcocobenzylammonium hydroxide, dimethylcocobenzylammonium chloride, tetramethylammonium hydroxide, tetramethylammonium chloride, tetraethylammonium hydroxide, tetraethylammonium chloride, tetrapropylammonium hydroxide, tetrapropylammonium chloride, diethyldimethylammonium hydroxide, diethyldimethylammonium chloride, triethylmethylammonium hydroxide, triethylmethylammonium chloride, aminoethylethanolamine, piperazine and derivatives thereof, and mixtures thereof.

11. The aqueous silica-based sol of claim 10, wherein the nitrogen-containing organic compound is selected from the group consisting of triethanolamine, diethanolamine, dipropylamine, aminoethylethanolamine, 2-methoxyethylamine, N,N-dimethylethanolamine, choline hydroxide, choline chloride, tetramethylammonium hydroxide, tetraethylammonium hydroxide, and tetraethanol ammonium hydroxide.

12. The aqueous silica-based sol of claim 1, wherein the nitrogen-containing organic compound contains at least one oxygen atom.

13. Aqueous silica-based sol comprising a nitrogen-containing organic compound having up to 25 carbon atoms and silica-based particles with a specific surface area of at least 700 square meters per gram of silica, the silica-based sol having a molar ratio of $SiO_2$ to N of from 2:1 to 40:1.

14. The aqueous silica-based sol of claim 13, wherein the nitrogen-containing organic compound has a molecular weight below 300.

15. The aqueous silica-based sol of claim 13, wherein it has an S-value within the range of from 15 to 40%.

16. The aqueous silica-based sol of claim 13, wherein it has a specific surface area in the range of from 150 to 250 square meters per gram of aqueous sol.

17. The aqueous silica-based sol of claim 13, wherein it has a silica content in the range of from 10 to 60% by weight.

18. The aqueous silica-based sol of claim 13, wherein it has a pH of from 8 to 13.

19. The aqueous silica-based sol of claim 13, wherein the nitrogen-containing organic compound is an amine containing from 2 to 12 carbon atoms.

20. The aqueous silica-based sol of claim 13, wherein the nitrogen-containing organic compound is a quaternary amine.

21. The aqueous silica-based sol of claim 13, wherein the nitrogen-containing organic compound is selected from the group consisting of propylamine, butylamine, cyclohexylamine, ethanolamine, 2-methoxyethylamine, diethylamine, dipropylamine, diisopropylamine, diethanolamine, pyrrolidine, triethylamine, triethanolamine, N,N-dimethylethanolamine, tetraethanol ammonium hydroxide, tetraethanol ammonium chloride, methyltriethanolammonium hydroxide, methyltriethanolammonium chloride, dimethyldiethanolammonium hydroxide, dimethyldiethanolammonium chloride, choline hydroxide, choline chloride, dimethylcocobenzylammonium hydroxide, dimethylcocobenzylammonium chloride, tetramethylammonium hydroxide, tetramethylammonium chloride, tetraethylammonium hydroxide, tetraethylammonium chloride, tetrapropylammonium hydroxide, tetrapropylammonium chloride, diethyldimethylammonium hydroxide, diethyldimethylammonium chloride, triethylmethylammonium hydroxide, triethylmethylammonium chloride, aminoethylethanolamine, piperazine and derivatives thereof, and mixtures thereof.

22. The aqueous silica-based sol of claim 21, wherein the nitrogen-containing organic compound is selected from the group consisting of triethanolamine, diethanolamine, dipropylamine, aminoethylethanolamine, 2-methoxyethylamine, N,N-dimethylethanolamine, choline hydroxide, choline chloride, tetramethylammonium hydroxide, tetraethylammonium hydroxide, and tetraethanol ammonium hydroxide.

23. The aqueous silica-based sol of claim 13, wherein the nitrogen-containing organic compound contains at least one oxygen atom.

24. Aqueous silica-based sol having a specific surface area of at least 100 square meters per gram of aqueous sol and comprising a nitrogen-containing organic compound having up to 25 carbon atoms and silica-based particles with a specific surface area of at least 300 square meters per gram of silica, the silica-based sol having a molar ratio of $SiO_2$ to N of from 2:1 to 40:1.

25. The aqueous silica-based sol of claim 24, wherein the silica-based particles have a specific surface area of from 550 to 1700 square meters per gram of silica.

26. The aqueous silica-based sol of claim 24, wherein the nitrogen-containing organic compound has a molecular weight below 300.

27. The aqueous silica-based sol of claim 24, wherein it has an S-value within the range of from 15 to 40%.

28. The aqueous silica-based sol of claim 24, wherein it has a specific surface area in the range of from 150 to 250 square meters per gram of aqueous sol.

29. The aqueous silica-based sol of claim 24, wherein it has a silica content in the range of from 10 to 60% by weight.

30. The aqueous silica-based sol of claim 24, wherein it has a pH of from 8 to 13.

31. The aqueous silica-based sol of claim 24, wherein the nitrogen-containing organic compound is an amine containing from 2 to 12 carbon atoms.

32. The aqueous silica-based sol of claim 24, wherein the nitrogen-containing organic compound is a quaternary amine.

33. The aqueous silica-based sol of claim 24, wherein the nitrogen-containing organic compound is selected from the group consisting of propylamine, butylamine, cyclohexylamine, ethanolamine, 2-methoxyethylamine, diethylamine, dipropylamine, diisopropylamine, diethanolamine, pyrrolidine, triethylamine, triethanolamine, N,N-dimethylethanolamine, tetraethanol ammonium hydroxide, tetraethanol ammonium chloride, methyltriethanolammonium hydroxide, methyltriethanolammonium chloride, dimethyldiethanolammonium hydroxide, dimethyldiethanolammonium chloride, choline hydroxide, choline chloride, dimethylcocobenzylammonium hydroxide, dimethylcocobenzylammonium chloride, tetramethylammonium hydroxide, tetramethylammonium chloride, tetraethylammonium hydroxide, tetraethylammonium chloride, tetrapropylammonium hydroxide, tetrapropylammonium chloride, diethyldimethylammonium hydroxide, diethyldimethylammonium chloride, triethylmethylammonium hydroxide, triethylmethylammonium chloride, aminoethylethanolamine, piperazine and derivatives thereof, and mixtures thereof.

34. The aqueous silica-based sol of claim 33, wherein the nitrogen-containing organic compound is selected from the group consisting of triethanolamine, diethanolamine, dipropylamine, aminoethylethanolamine, 2-methoxyethylamine, N,N-dimethylethanolamine, choline hydroxide, choline chloride, tetramethylammonium hydroxide, tetraethylammonium hydroxide, and tetraethanol ammonium hydroxide.

35. The aqueous silica-based sol of claim 24, wherein the nitrogen-containing organic compound contains at least one oxygen atom.

36. Process for the production of an aqueous silica-based sol which comprises incorporating a nitrogen-containing organic compound having up to 25 carbon atoms in a silica-based sol containing silica-based particles with a specific surface area of at least 300 square meters per gram of silica and having an S-value in the range of from 10 to 60%.

37. The process of claim 36, wherein the nitrogen-containing organic compound has a molecular weight below 300.

38. The process of claim 36, wherein the aqueous silica-based sol contains silica-based particles with a specific surface area of from 550 to 1700 square meters per gram of silica.

39. The process of claim 36, wherein the aqueous silica-based sol obtained is concentrated to a specific surface area in the range of from 150 to 250 square meters per gram of aqueous sol.

40. The process of claim 36, wherein the nitrogen-containing organic compound is an amine containing from 2 to 12 carbon atoms.

41. The process of claim 36, wherein the nitrogen-containing organic compound contains at least one oxygen atom.

42. Process for the production of an aqueous silica-based sol which comprises incorporating a nitrogen-containing organic compound having up to 25 carbon atoms in a silica-based sol containing silica-based particles with a specific surface area of at least 700 square meters per gram of silica, the obtained silica-based sol having a molar ratio of $SiO_2$ to N of from 2:1 to 40:1.

43. The process of claim 42, wherein the nitrogen-containing organic compound has a molecular weight below 300.

44. The process of claim 42, wherein the aqueous silica-based sol contains silica-based particles with a specific surface area of from 550 to 1700 square meters per gram of silica.

45. The process of claim 42, wherein the aqueous silica-based sol obtained is concentrated to a specific surface area in the range of from 150 to 250 square meters per gram of aqueous sol.

46. The process of claim 42, wherein the nitrogen-containing organic compound is an amine containing from 2 to 12 carbon atoms.

47. The process of claim 42, wherein the nitrogen-containing organic compound contains at least one oxygen atom.

48. Process for the production of an aqueous silica-based sol which comprises incorporating a nitrogen-containing organic compound having up to 25 carbon atoms in a silica-based sol containing silica-based particles with a specific surface area of at least 300 square meters per gram of silica and concentrating the aqueous silica-based sol obtained to a specific surface area of at least 100 square meters per gram of aqueous sol, the obtained silica-based sol having a molar ratio of $SiO_2$ to N of from 2:1 to 40:1.

49. The process of claim 48, wherein the nitrogen-containing organic compound has a molecular weight below 1,000.

50. The process of claim 48, wherein the aqueous silica-based sol contains silica-based particles with a specific surface area of from 550 to 1700 square meters per gram of silica.

51. The process of claim 48, wherein the aqueous silica-based sol obtained is concentrated to a specific surface area in the range of from 150 to 250 square meters per gram of aqueous sol.

52. The process of claim 48, wherein the nitrogen-containing organic compound is an amine containing from 2 to 12 carbon atoms.

53. The process of claim 48, wherein the nitrogen-containing organic compound contains at least one oxygen atom.

54. Process for the production of paper from an aqueous suspension containing cellulosic fibres, and optional fillers, which comprises adding to the suspension an aqueous silica-based sol comprising an organic nitrogen-containing compound having up to 25 carbon atoms and at least one charged organic polymer, forming and draining the suspension on a wire.

55. The process of claim 54, wherein the sol contains silica-based particles with a specific surface area of at least 300 square meters per gram of silica.

56. The process of claim 54, wherein the charged organic polymer comprises a cationic starch and/or cationic polyacrylamide.

57. Aqueous silica-based sol comprising a nitrogen-containing organic compound and silica-based particles with a specific surface area of at least 300 square meters per gram of silica and having an S-value within the range of from 10 to 60%, the silica-based particles having colloidal borosilicate, aluminum-modified silica or aluminum silicate.

58. The aqueous silica-based sol of claim 57, wherein the silica-based particles has a specific surface area of from 550 to 1700 square meters per gram of silica.

59. The aqueous silica-based sol of claim 57, wherein the nitrogen-containing organic compound has a molecular weight below 1000.

60. The aqueous silica-based sol of claim 57, wherein the S-value is within the range of from 15 to 40%.

61. The aqueous silica-based sol of claim 57, wherein it has a specific surface area in the range of from 150 to 250 square meters per gram of aqueous sol.

62. The aqueous silica-based sol of claim 57, wherein it has a silica content in the range of from 10 to 60% by weight.

63. The aqueous silica-based sol of claim 57, wherein the nitrogen-containing organic compound is an amine containing from 2 to 12 carbon atoms.

64. The aqueous silica-based sol of claim 57, wherein the nitrogen-containing organic compound is a quaternary amine.

65. The aqueous silica-based sol of claim 57, wherein the nitrogen-containing organic compound is selected from the group consisting of propylamine, butylamine, cyclohexylamine, ethanolamine, 2-methoxyethylamine, diethylamine, dipropylamine diisopropylamine, diethanolamine, pyrrolidine, triethylamine, triethanolamine, N,N-dimethylethanolamine, tetraethanol ammonium hydroxide, tetraethanol ammonium chloride, methyltriethanolammonium hydroxide, methyltriethanolammonium chloride, dimethyldiethanolammonium hydroxide, dimeth yldiethanolammonium chloride, choline hydroxide, choline chloride, dimethylcocobenzylammonium hydroxide, dimethylcocobenzylammonium chloride, tetramethylammonium hydroxide, tetramethylammonium chloride, tetraethylammonium hydroxide, tetraethylammonium chloride, tetrapropylammonium hydroxide, tetrapropylammonium chloride, diethyldimethylammonium hydroxide, diethyldimethylammonium chloride, triethylmethylammonium hydroxide, triethylmethylammonium chloride, aminoethylethanolamine, piperazine and derivatives thereof, and mixtures thereof.

66. The aqueous silica-based sol of claim 57, wherein the nitrogen-containing organic compound is selected from the group consisting of triethanolamine, diethanolamine, dipropylamine, aminoethylethanolamine, 2-methoxyethylamine, N,N-dimethylethanolamine, choline hydroxide, choline chloride, tetramethylammonium hydroxide, tetraethylammonium hydroxide, and tetraethanol ammonium hydroxide.

67. Process for the production of paper from an aqueous suspension containing cellulosic fibres, and optional fillers, which comprises adding to the suspension (i) an aqueous silica-based sol comprising silica-based particles and an organic nitrogen-containing compound, the silica-based particles being colloidal borosilicate, aluminum-modified silica or aluminum silicate; and (ii) at least one charged organic polymer; forming and draining the obtained suspension on a wire.

68. The process of claim 67, wherein the silica-based particles has a specific surface area of at least 300 square meters per gram of silica.

69. The process of claim 67, wherein the charged organic polymer comprises a cationic starch and/or cationic polyacrylamide.

* * * * *